March 3, 1959
L. COES, JR
2,876,072
COESITE SILICA
Filed March 9, 1956
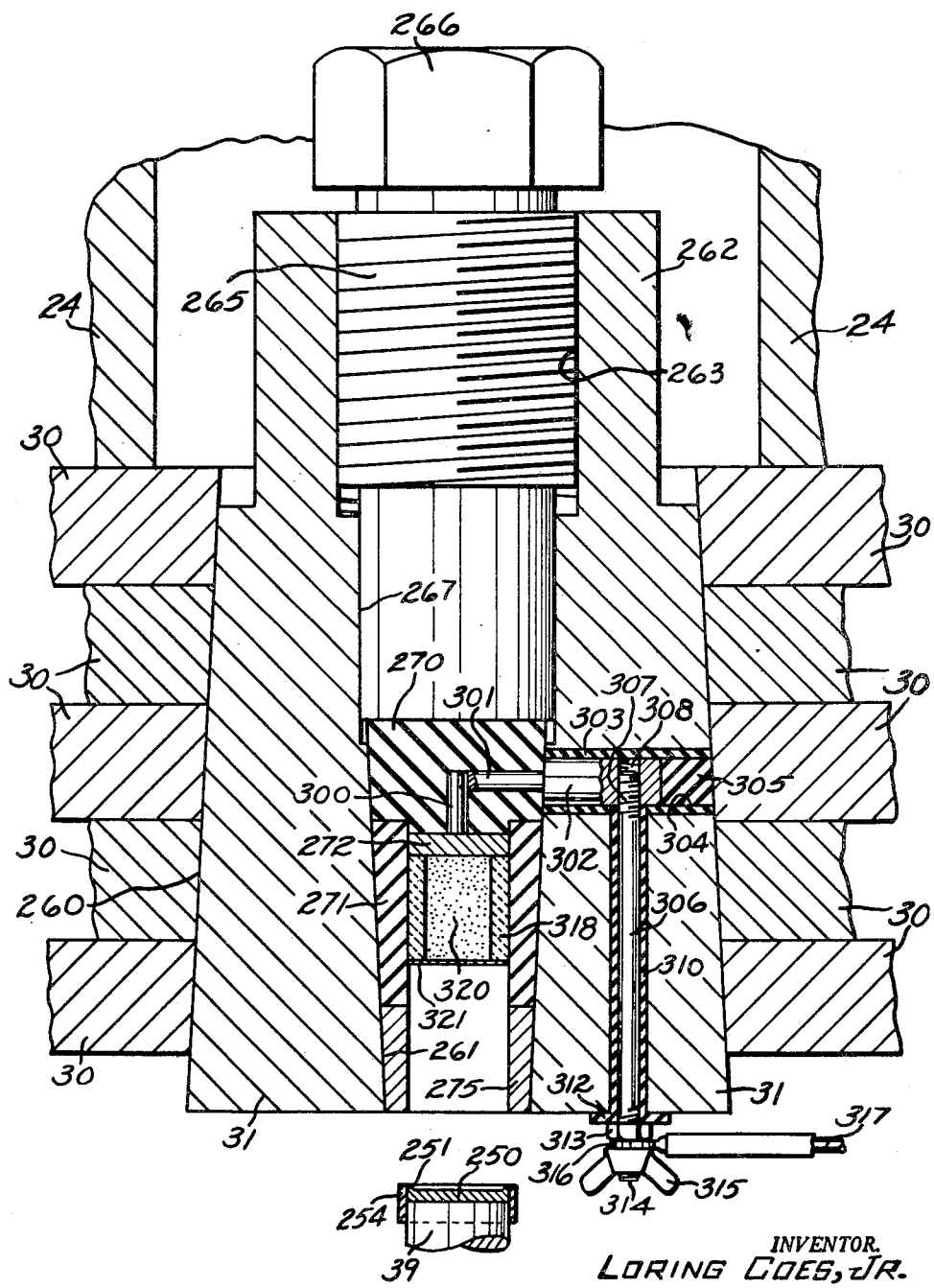
INVENTOR.
LORING COES, JR.
BY
George Crompton, Jr.
ATTORNEY _United States Patent Office_

2,876,072
Patented Mar. 3, 1959

2,876,072
COESITE SILICA

Loring Coes, Jr., Brookfield, Mass., assignor to Norton Company, Worcester, Mass., a corporation of Massachusetts Application March 9, 1956, Serial No. 570,502

6 Claims. (Cl. 23—182)

The invention relates to silica and provides a new polymorphic form, heavier than quartz, and occupying an end position in the system silica glass, quartz, tridymite, cristobalite. It crystallizes in the monoclinic system. I term the new polymorph of silica coesite silica because it has been so christened by Professor Robert B. Sosman, School of Ceramics, Rutgers University, in "Science," May 21, 1954, page 738, and it is known to many others by that name. This application is a continuation-in-part of my copending application Serial No. 294,384, filed June 19, 1952, and now abandoned.

This new polymorph of silica has been described by me in "Science" for July 31, 1953, in an article starting on page 131. It has been more completely discussed in an article in "The American Mineralogist" for November and December 1955, starting on page 975, by Professor Lewis S. Ramsdell of the University of Michigan, Professor Ramsdell being Professor of Mineralogy. These professors, and many other scientists, too, have agreed that my new silica which is now termed coesite silica is a true polymorph and the first one to be synthesized by man, the natural forms of silica being given above.

The object of the invention therefore is to produce a new form of silica. Another object of the invention is to provide a new crystal useful as an electrical valve and in transistors. Another object of the invention is to provide a composition of matter useful as a piezo-electric crystal.

Other objects will be in part obvious or in part pointed out hereinafter.

The accompanying drawing is a vertical sectional view of the mold parts and the top of the mold plunger of the high pressure apparatus which is the subject matter of U. S. Letters Patent No. 2,544,414 to Percy W. Bridgman, Raymond R. Ridgway and Edward Van der Pyl, the details of the mold being changed somewhat.

The coesite silica can be made by heating alkali silicate to a temperature of from 600° C. to 800° C. under a pressure of from 30,000 to 40,000 atmospheres. Any of sodium silicate, potassium silicate, lithium silicate, rubidium silicate or cesium silicate can be used. Sodium silicate is the cheapest and so therefore will probably be preferred. The exact formula or composition of the alkali silicate is not important. I can use sodium silicate, $Na_2O \cdot SiO_2$ in powdered form having only a trace of water, fill the mold therewith, and press at 30,000 atmospheres at a temperature of 600° C. for from one to twenty hours. The longer the time used the larger will be the resulting crystals of the coesite silica. Furthermore the higher the pressure and the greater the temperature the larger will be the quantity of the coesite silica produced. This process may be termed a piezolytic decomposition process. The presence of elements or combinations of them which would make possible the separation of the silica in the form of kyanite, pyroxenes, or garnets should be avoided since these phases are more stable.

Another process for the production of coesite silica is the polymorphic transformation of silica glass, quartz, tridymite, or cristobalite under the above conditions of heat and pressure with the help of a mineralizer, preferably monoammonium phosphate or boric acid. The amount of the monoammonium phosphate or boric acid to add is not critical but 10% by weight is a practical proportion. Thus I can take powdered flint (quartz) say 220 grit size and finer and mix it thoroughly with 10% of boric acid $H_3BO_3$ powder and press it from 30,000 to 40,000 atmospheres at a temperature of from 600° C. to 800° C. for from one to twenty hours. The same observations apply, namely that the longer the process is allowed to continue, the larger will be the crystals of the coesite silica and the higher the pressure, the higher the temperature, the more material will be converted.

Either process above described produces a polymorph of crystalline silica having a refractive index of 1.60 alpha, and in which the optical sign is positive with an optic axial angle of 54 degrees, having a density of 3.01 grams per cubic centimeter, and a hardness close to topaz which has a hardness of 8 on Mohs's scale.

Any suitable high pressure apparatus with provisions for heating the silica containing material may be used to carry out the invention. Merely as a convenience I refer to patent to Bridgman, Ridgway and Van der Pyl, No. 2,544,414 which as explained in the patent describes a press and hydraulic mechanism capable of producing pressures as high as 30,000 atmospheres, but even higher pressures were actually reached with the apparatus. I will use the reference numbers of the patent to facilitate comparison of this disclosure with the Bridgman et al. patent.

At the top of the press is a massive cap 24, only part of which is herein shown, and held down by the cap 24 is a series of circular heavy internally tapered steel plates 30 which encircle and reinforce a center cavity block 31 which constitutes the anvil or mold of the press. The press has a mold plunger 39 and on top of this mold plunger is a steel disc 250 which has a lip 251 the outside of which is a continuation of the cylindrical surface of the disc and the inner side of which is a portion of an inner conical surface. This disc 250 takes the full pressure and will expand somewhat thereunder to seal the mold. As a means for aligning the disc 250 on the plunger 39 there is provided a brass ring 254 which merely (relatively) moves down as the plunger 39 goes into the mold.

The cavity block 31 is a massive piece of steel having a gently tapered exterior conical surface 260 which fits the taper of the inside of the plates 30. Thus the pressure causes a reaction which compresses the cavity block radially and the great width of the plates 30 provides adequate strength to resist the action without splitting the plates. The inner surface 261 of the lower part of the cavity block 31 is conical but tapered in the opposite direction so that the pressure will not weld the parts together. Thus despite the use of pressure up to 30,000 atmospheres and above it has been possible to disassemble the mold parts from the cavity block.

The upper portion of the cavity block 31 is cylindrical outside and has a cylindrical screw threaded bore 263 inside. The thread is massive and strong. In the bore 263 is a large steel plug 265 which is threaded, likewise with a massive strong thread. The plug 265 has a large hexagonal head 266 by means of which it can be screwed into place with great pressure and later removed. Adjacent to the threaded bore 263 in between it and the conical surface 261 is a cylindrical bore 267 of the cavity block 31.

Fitting in the cavity block 31 inside the conical surface 261 thereof are mold parts comprising, on top a tapered anvil member 270 made of sintered alumina, below that a tapered mold liner 271 made of sintered alumina, inside of the liner 271 a disc 272 made of steel, and, below the liner 271 a bottom tapered mold liner 275 made of steel.

I do not use the heating electrodes 40 and 40a nor the associated mechanism described in the Bridgman et al. patent. According to that patent the specimen was heated outside of the mold and then subjected to pressure in the mold and there was no provision for supplying thermal energy to the specimen or mass being pressed while it was in the mold, and thus the specimen or mass remained at a high temperature for only a short time as the heat was gradually dissipated. As aforesaid I propose to heat the silica containing material to a temperature of at least 600° C. for at least one hour and preferably for a much longer time. Accordingly I provide means for electrically heating the material in the mold.

In contact with the steel disc 272 is a copper rod 300 (the reference numerals now no longer correspond to any in the Bridgman et al. patent) which extends vertically and is in contact with a horizontally extending copper rod 301, the anvil member 270 having been molded with axial and horizontal bores as shown. The copper rod 301 is in contact with a larger cylindrical piece of copper 302 surrounded by an insulating sleeve 303 in a horizontal bore 304 formed in the cavity block 31. A massive piece of insulation 305 inside of the sleeve 303 backs up the cylindrical piece of copper 302. A long vertical copper rod 306 is threaded at both ends and the upper threaded end 307 is screwed into a threaded bore 308 in the cylindrical piece 302. The rod 306 is inside of an insulating sleeve 310 fitting in a vertical bore formed in the cavity block 31. An insulating washer 312 protects a nut 313 from electrical contcat with the cavity block 31, while the nut 313 located on the lower threaded end 314 of the rod 306 locks the parts firmly together. A wing nut 315 secures in place on the lower end 314 a terminal 316 with a hole therethrough of a copper cable 317. Fitting nicely in the liner 271 is a graphite sleeve 318 which is crushed during the process but nevertheless continues to conduct electricity. It will now be seen that electric energy can be passed through the graphite sleeve 318 thus heating the material 320 which is to be transformed to triclinic silica. The current passes into the plunger 39 and hence through the mold liner 275 into the cavity block 31 and hence to all parts of the press which constitute a ground and any connection, not shown, can be made to the press at any convenient place from the side of the transformer used opposite that to which the cable 317 is connected. It is not believed necessary to show such a simple circuit diagrammatically.

As a source of power I have found it convenient to use 60 cycles single phase alternating current. The material for the insulating sleeve 303, the insulation 305, and the insulating sleeve 310 can be sintered alumina.

The Bridgman et al. patent describes how the main ram operates the plunger 39, how the plunger 39 first goes into the mold under low pressure and then is operated by the main ram under high pressure and I will not repeat this description nor is it necessary to re-illustrate the remainder of the Bridgman et al. apparatus especially since other types of presses can be used provided they will reach the pressures required. Simply to keep the material 320 from falling out of the liners 271 and 275, I provide a thin steel disc 321 which fits the liner 271 with a tight fit.

Coesite silica is the stable form of silica at pressures of above 30,000 atmospheres at 600° C. Coesite silica is the stable form of silica at pressures of above 40,000 atmospheres at 800° C. At temperatures higher than 800° C., pressures higher than 40,000 atmospheres should be used to obtain coesite silica. This polymorph can be obtained at any reasonable temperature above 600° C. provided the pressure is great enough, so far as I am aware; however greater and greater pressures are required as the temperature is raised, and the curve is not a straight line curve since at temperatures much higher than 600° C. an increase of 200° C. in temperature will require increasing the pressure by much more than 10,000 atmospheres.

With presently known materials pressures of more than 40,000 atmospheres at temperatures of more than 800° C. held for one hour or more present substantial practical difficulties, so in one aspect my process comprises heating at from 600° C. to 800° C. at pressures of from 30,000 to 40,000 atmospheres for one hour or more. However because technology continually advances I wish to claim 600° C. and above and 30,000 atmospheres and above. Quartz, tridymite and cristobalite as well as silica glass are all ordinary forms of silica and are so referred to in the claims. The first three are the ordinary crystalline forms. The following table gives comparative parameters for the four crystalline forms.

Table

| Parameter | Quartz | Tridymite | Cristobalite | Coesite |
|---|---|---|---|---|
| Specific gravity | 2.7 | 2.3 | 2.3 | 3.0. |
| Hardness, Mohs's scale | 7 | between 6 and 7. | between 6 and 7. | 7.7. |
| Hardness, Knoop 100 scale | 820 | undetermined. | undetermined. | 1200. |
| Optical sign | + | + | − | +. |
| Optic axial angle | none | 35° | none | 54°. |
| Index of refraction, Alpha | none | 1.47 | none | 1.60. |
| Cell dimensions: | | | | |
| (a) | 4.91 A | 9.88 A | 4.96 A | 7.23 A. |
| (b) | none | 17.1 A | none | 12.52 A. |
| (c) | 5.40 A | 16.3 A | 6.92 A | 7.23 A. |

The specific gravity of silica glass sometimes called fused silica or amorphous silica is 2.20. Its hardness is between 6 and 7 on Mohs's scale, undetermined on Knoop 100 scale. It has no optical sign nor any optic axial angle nor any index of refraction alpha but its straight index of refraction is 1.46.

Silica is found in nature primarily in forms such as sand, sandstone and flint pebbles. These materials have the polymorphic form of quartz. Cristobalite and tridymite have also been found in nature but are rare being found in volcanic ash and meteorites. In commercial products all three forms of silica are quite common. In the silica brick in the roof of the open hearth furnace all three forms of silica are found, that is quartz, tridymite and cristobalite, depending on the time and temperature to which the brick has been exposed. Silica is practially always procured in the form of quartz and is frequently called flint. It is used to make bricks, and also to make sodium silicate (water glass) and it is also a very common constituent of ceramics of all kinds.

The non-crystalline form of silica referred to as fused silica because it is obtained by fusing quartz, and cooling rapidly to prevent re-crystallization, is used for tubes for furnaces and for windows for various kinds of apparatus and is the chief constituent of most kinds of glass. Crown glass is principally fused silica.

Coesite is sharply distinguished from all the above three forms of crystalline silica as well as from fused silica by the parameters given in the above table and is a distinctly new form of matter. Any crystallographer can readily distinguish coesite from the other forms of silica.

It will thus be seen that there has been provided by this invention coesite silica and processes for making it in accordance with the object of this invention. As the processes have many possible embodiments and as many changes might be made in the embodiments above set forth, it is to be understood that all matter hereinbefore set forth or shown in the accompanying drawing is to be interpreted as illustrative and not in a limiting sense.

I claim:

1. A polymorph of silica, $SiO_2$, consisting of crystalline coesite silica having a specific gravity of 3.0, having a positive optical sign, an optic axial angle of 54° and a refractive index of 1.60 alpha and a hardness close to 8 on Mohs's scale.

2. Process for producing a polymorph of silica comprising heating silica containing material to a temperature of at least 600° C. under a pressure of at least 30,000 atmospheres for at least one hour.

3. Process for producing a polymorph of silica comprising heating alkali silicate to a temperature of at least 600° C. under a pressure of at least 30,000 atmospheres for at least one hour.

4. Process for producing a polymorph of silica comprising the polymorphic transformation of an ordinary form of silica by heating it at a temperature at least 600° C. under a pressure of at least 30,000 atmospheres for at least one hour.

5. Process according to claim 4 in which monoammonium phosphate is used as a mineralizer.

6. Process according to claim 4 in which boric acid is used as a mineralizer.

References Cited in the file of this patent

UNITED STATES PATENTS 2,544,414    Bridgman et al. -------- Mar. 6, 1951

OTHER REFERENCES

Bridgman: "Journal of Chemical Physis," vol. 15, #2, February 1947, pp. 92–98.

Mellor: "Inorg. and Theor. Chem.," vol. 6, p. 241, Fig. 26.